United States Patent [19]

Lal et al.

[11] Patent Number: 4,478,980
[45] Date of Patent: Oct. 23, 1984

[54] BLENDS OF HIGHER ALPHA-OLEFIN POLYMERS AND 1,2-EPOXIDE POLYMERS

[75] Inventors: Joginder Lal, Akron; Paul H. Sandstrom, Tallmadge, both of Ohio

[73] Assignee: The Goodyear Tire & Rubber Company, Akron, Ohio

[21] Appl. No.: 416,794

[22] Filed: Sep. 13, 1982

[51] Int. Cl.³ .................. C08L 23/20; C08L 71/00
[52] U.S. Cl. .................................. 525/187; 528/393
[58] Field of Search .................................. 525/187

[56] References Cited

U.S. PATENT DOCUMENTS

| | | | |
|---|---|---|---|
| 3,285,804 | 11/1966 | Robinson | 525/187 |
| 3,666,737 | 5/1972 | Lal et al. | 525/187 |
| 3,726,828 | 4/1973 | Hawley et al. | 525/187 |

*Primary Examiner*—Wilbert J. Briggs, Sr.
*Attorney, Agent, or Firm*—Alvin T. Rockhill

[57] ABSTRACT

There is disclosed a rubbery composition comprising a blend of between 95/5 and 5/95 weight percent of (1) a rubbery interpolymer consisting of (a) at least 80 weight percent of at least one α-olefin containing from 5 to 10 carbon atoms and (b) up to 20 weight percent of a nonconjugated polyene containing from 5 to 30 carbon atoms with (2) a saturated polymer of an α-olefin oxide prepared from at least one monomer having the structure:

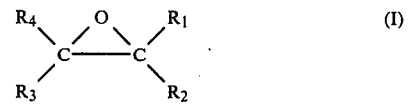

wherein $R_1$ and $R_2$ are selected from the group consisting of hydrogen or a lower alkyl radical containing from 1 to 8 carbon atoms and $R_3$ and $R_4$ are selected from the group consisting of hydrogen, a lower alkyl radical containing from 1 to 8 carbon atoms and an alkoxyalkyl radical containing up to 12 carbon atoms, an aryl radical, a haloalkyl radical containing from 1 to 12 carbon atoms and in which $R_3$ and $R_4$ taken together may be trimethylene, tetramethylene, or hexamethylene, thereby forming a cyclic epoxide, or (3) an unsaturated copolymer of an α-olefin oxide prepared from 80 to 99.5 weight percent of at least one monomer having the structure I; with from 0.5 to 20 weight percent of a comonomer selected from the group consisting of butadiene monoxide, isoprene monoxide, 1,2-epoxy-3-allyloxypropane (allyl glycidyl ether), 4,5-epoxy-1-hexene, 4,5-epoxy-2-hexene, 1,5-cyclooctadiene monoepoxide, 1-vinyl-3,4-epoxycyclohexane and limonene monoxide.

10 Claims, 4 Drawing Figures

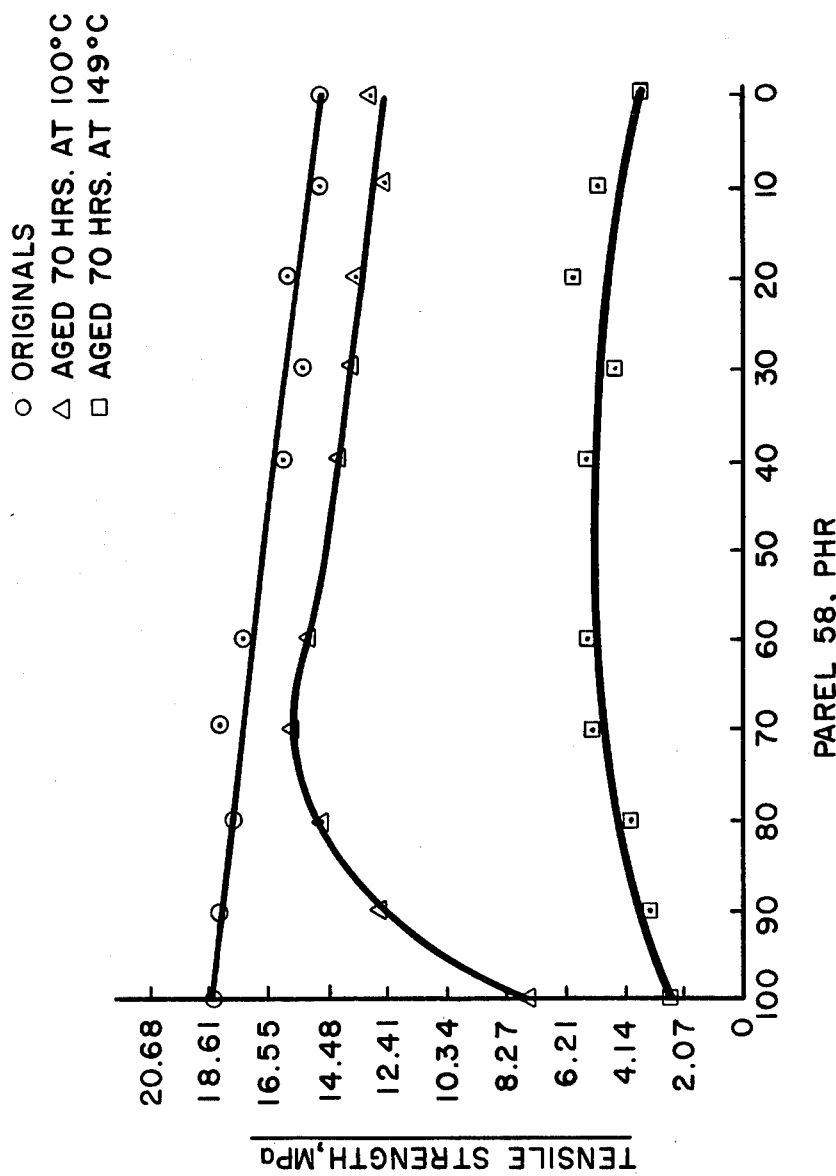

BLENDS OF HIGHER ALPHA-OLEFIN POLYMERS AND 1,2-EPOXIDE POLYMERS

TECHNICAL FIELD

This invention relates to certain synthetic rubber blends which possess excellent processing characteristics and to a method of controlling the building tack, extrudability, and/or processibility of such blends. More particularly, it relates to an improved rubber blend composition comprising a mixture of between 95/5 and 5/95 weight percent of (1) a rubbery interpolymer consisting of (a) at least 80 weight percent of at least one α-olefin containing from 5 to 10 carbon atoms and (b) up to 20 weight percent of a nonconjugated polyene containing from 5 to 30 carbon atoms with (2) a saturated polymer of an α-olefin oxide prepared from at least one monomer having the structure:

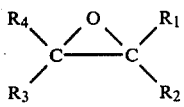 (I)

wherein $R_1$ and $R_2$ are selected from the group consisting of hydrogen or a lower alkyl radical containing from 1 to 8 carbon atoms and $R_3$ and $R_4$ are selected from the group consisting of hydrogen, a lower alkyl radical containing from 1 to 8 carbon atoms and an alkoxyalkyl radical containing up to 12 carbon atoms, an aryl radical, a haloalkyl radical containing from 1 to 12 carbon atoms and in which $R_3$ and $R_4$ taken together may be trimethylene, tetramethylene, or hexamethylene, thereby forming a cyclic epoxide, or (3) an unsaturated copolymer of an α-olefin oxide prepared from 80 to 99.5 weight percent of at least one monomer having the structure I; with from 0.5 to 20 weight percent of a comonomer selected from the group consisting of butadiene monoxide, isoprene monoxide, 1,2-epoxy-3-allyloxypropane (allyl glycidyl ether), 4,5-epoxy-1-hexene, 4,5-epoxy-2-hexene, 1,5-cyclooctadiene monoepoxide, 1-vinyl-3,4-epoxycyclohexane and limonene monoxide.

BACKGROUND OF THE INVENTION

Building tack is a term of art employed in rubber processing technology. It generally refers to the surface property of any compounded unvulcanized rubber stock which enables two pieces of unvulcanized rubber to adhere together when brought in contact under moderate pressure. It is generally measured by the amount of force required to separate two pieces of such rubber stock after they have adhered together for a short period of time. A convenient method of evaluating building tack is by the use of a device called Ketjen Tackmeter. Tack is an important and necessary property of various compounded rubber stocks in an uncured state in order that these uncured compounded rubber stocks may be fabricated into various commercially useful rubber products, such as tires, hoses, belts and the like. A problem is sometimes encountered when employing certain kinds or types of synthetic rubbers due to poor tack.

For instance, synthetic rubbers which are saturated or unsaturated polymers of α-olefin oxides as defined above do not possess good building tack. They are extremely difficult to fabricate into finished rubber goods because of their poor building tack.

On the other hand, a synthetic rubber which is prepared by the polymerization of at least 80 weight percent of at least one $C_5$–$C_{10}$ α-olefin with up to 20 weight percent of at least one $C_5$–$C_{30}$ nonconjugated polyene possesses extremely good building tack but sometimes exhibits a processibility problem.

The term "processibility" is another characteristic of a synthetic rubber and refers to the ability to form a coherent sheet or band on a conventional rubber mill. A synthetic rubber which does not possess good processibility characteristics may crumble and fall off the mill rolls while being compounded with the compounding ingredients necessary for their cure. Such compounded stocks exhibit uneven surfaces or ragged edges because of their lack of good processing characteristics.

Extrudability is another important characteristic of a rubber which is to be employed in the manufacturing operations where rubber must be extruded to form the shaped article prior to curing. A rubber which extrudes poorly will exit the extrusion dye with ragged edges resulting in either rejects or an excessive and costly trimming problem. A standardized method for the evaluation of extrudability is set forth in ASTM D-2230.

The applicants have discovered that their invention provides rubber compositions which in the uncured state exhibits good building tack, good processibility and good extrudability.

SUMMARY OF THE INVENTION

A rubbery composition comprising a blend of between 95/5 and 5/95 weight percent of (1) a rubbery interpolymer consisting of (a) at least 80 weight percent of at least one α-olefin containing from 5 to 10 carbon atoms and (b) up to 20 weight percent of a nonconjugated polyene containing from 5 to 30 carbon atoms with (2) a saturated polymer of an α-olefin oxide prepared from at least one monomer having the structure:

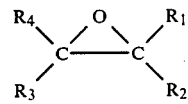 (I)

wherein $R_1$ and $R_2$ are selected from the group consisting of hydrogen or a lower alkyl radical containing from 1 to 8 carbon atoms and $R_3$ and $R_4$ are selected from the group consisting of hydrogen, a lower alkyl radical containing from 1 to 8 carbon atoms and an alkoxyalkyl radical containing up to 12 carbon atoms, an aryl radical, a haloalkyl radical containing from 1 to 12 carbon atoms and in which $R_3$ and $R_4$ taken together may be trimethylene, tetramethylene or hexamethylene, thereby forming a cyclic epoxide, or (3) an unsaturated copolymer of an α-olefin oxide prepared from 80 to 99.5 weight percent of at least one monomer having the structure I; with from 0.5 to 20 weight percent of a comonomer selected from the group consisting of butadiene monoxide, isoprene monoxide, 1,2-epoxy-3-allyloxypropane (allyl glycidyl ether), 4,5-epoxy-1-hexene, 4,5-epoxy-2-hexene, 1,5-cyclooctadiene monoepoxide, 1-vinyl-3,4-epoxycyclohexane and limonene monoxide.

DETAILED DESCRIPTION

Figure 1:
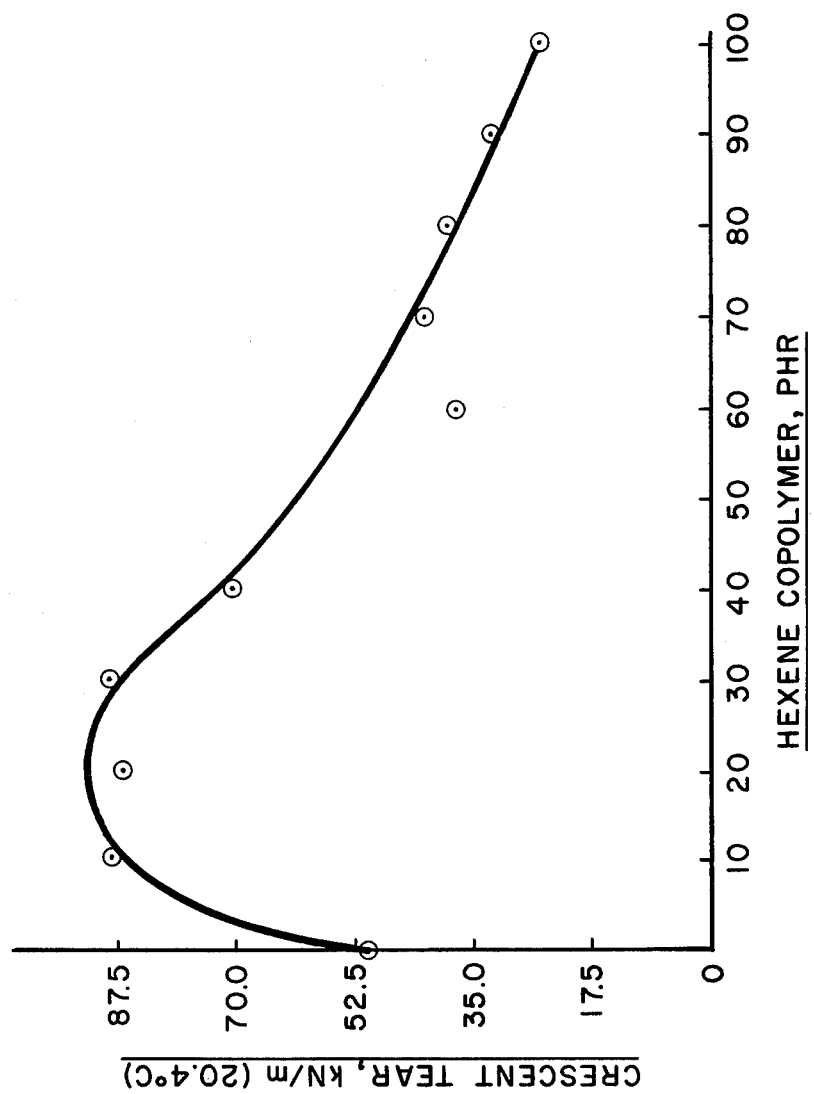

As has been indicated the present invention comprises a blend of (1) a rubbery sulfur vulcanizable unsaturated interpolymer of at least one olefin containing from 5 to 10 carbon atoms with a nonconjugated polyene containing from 5 to 30 carbon atoms, with (2) a polymer of an α-olefin oxide prepared from at least one epoxide monomer of structure I.

The preparation of the sulfur vulcanizable unsaturated interpolymer of at least one terminally unsaturated mono-olefin, selected from the group consisting of α-olefins containing from 5 to 10 carbon atoms with at least one nonconjugated polyene containing from 5 to 30 carbon atoms is carried out by the solution polymerization with a transition metal-based coordination catalyst system, employing an inert solvent, such as benzene, toluene, hexane, heptane and the like.

One such catalyst system for carrying out such polymerizations is a 3-component catalyst system which is a mixture of triethylaluminum/titanium tetrachloride/vanadium tetrachloride, preformed in accordance with the general procedure of British Patent No. 886,371.

Other catalyst systems for preparing unsaturated interpolymers consist of mixtures of delta-titanium trichloride/triethylaluminum or delta-titanium trichloride/diethylaluminum chloride.

Methods of preparing such sulfur-vulcanizable unsaturated interpolymers are claimed and disclosed in U.S. Pat. No. 3,933,769, issued Jan. 20, 1976, and are further disclosed in U.S. Pat. No. 3,991,262, issued Nov. 9, 1976. Examples of $C_5$-$C_{30}$ nonconjugated dienes and polyenes are listed in U.S. Pat. No. 3,794,696, issued Feb. 26, 1974. The preferred nonconjugated dienes are 4-methyl-1,4-hexadiene and 5-methyl-1,4-hexadiene. The general disclosure and description found in these U.S. patents are incorporated into the disclosure of the present application.

The polymers of the α-olefin oxides which constitute one component of the blend composition of the present invention are prepared from an epoxide monomer (Structure I) or an epoxide monomer (Structure I) and a comonomer such as butadiene monoxide, isoprene monoxide, allyl glycidyl ether, and the like. A description of the preparation of such polymers can be found in U.S. Pat. No. 3,509,068, issued Apr. 28, 1970. The disclosure and description in this patent is incorporated into this application by reference.

Additional details on the polymerization of olefin oxides can be found in the *Journal of Polymer Science*, Vol. 11, 119–133 (1973). This too is incorporated by reference.

The inherent viscosities of the blend components may be in the range of about 1 to 10 dl/g, the preferred range being about 2 to 8 dl/g. Inherent viscosity is defined as the natural logarithm of the relative viscosity at 30° C. divided by the polymer concentration of a 0.05 to 0.1 percent (weight/volume) solution in toluene containing 0.1 percent stabilizer and expressed in units of deciliters per gram (dl/g).

The thrust of the present invention is the blending of a mixture of the two different types of polymers described above to obtain as a product a blend which exhibits unusual physical properties.

It is apparent to persons familiar with chemistry of vulcanization that unsaturated polymers are typically cured with a sulfur/accelerator recipe; however, unsaturated polymers can also be cured with a peroxide-based recipe. In contrast, saturated polymers require curing with a peroxide-based recipe, or radiation (electrons, and γ-radiation). When the blend composition contains both saturated and unsaturated components, the peroxide or radiation cure is preferred. For instance, blend compositions containing unsaturated polymers of α-olefin oxides, such as Parel 58, and saturated interpolymers of α-olefins, such as poly 1-hexene, would normally be cured with a peroxide-based recipe or radiation. Blends of saturated α-olefin polymers and unsaturated interpolymers of α-olefins and nonconjugated polyenes would also be typically cured with peroxide or radiation. An example of such a blend is poly(propylene oxide) and an unsaturated interpolymer of 1-hexene and 1,7-octadiene. However, blend compositions of saturated α-olefin oxide polymers and saturated interpolymers of α-olefins require peroxide-based cure recipes or radiation. An example of such a blend is a mixture of a saturated copolymer of propylene oxide and 1,2-butene oxide and a saturated interpolymer of 1-hexene and 1-decene.

The attached FIGS. 1 through 4 show some of the unusual physical properties of blends of a commercial unsaturated copolymer of propylene oxide, produced by the Hercules Corporation, Inc. and sold under the tradename, Parel 58, when it is mixed with a copolymer of 1-hexene and 10 mole percent of a 60:40 weight percent mixture of 4-methyl- and 5-methyl-1,4-hexadienes. These copolymer stocks were prepared separately in a Banbury mixer with 50 parts per hundred of rubber (phr) of an intermediate super abrasion furnace carbon black (ISAF), 5 phr zinc oxide, and 1 phr of stearic acid. Each of the above black stocks was separately mixed on a two roll rubber mill with 0.5 phr of 2-mercaptobenzothiazole, 1 phr of tetramethylthiuram disulfide and 2 phr of sulfur. The two fully compounded rubber stocks were then mixed together on a two-roll mill in the designated proportions as shown in the attached Figures. The curing conditions were 15 minutes at 149° C. for the tensile and tear strength examples exemplified in the Figures and the cure times were 25 minutes at 149° C. for the compression set example.

In FIG. 1, data are shown for the tear strength (die C) as a function of blend composition. This test was conducted according to ASTM D-624. The blend compositions containing from 10 to 40 phr of the hexene copolymer exhibit tear strength values considerably higher than Parel 58. The data shown in FIG. 1 are not anticipated since the tear strength value of the hexene copolymer is really only about one-half of that shown for Parel 58.

Figure 2:
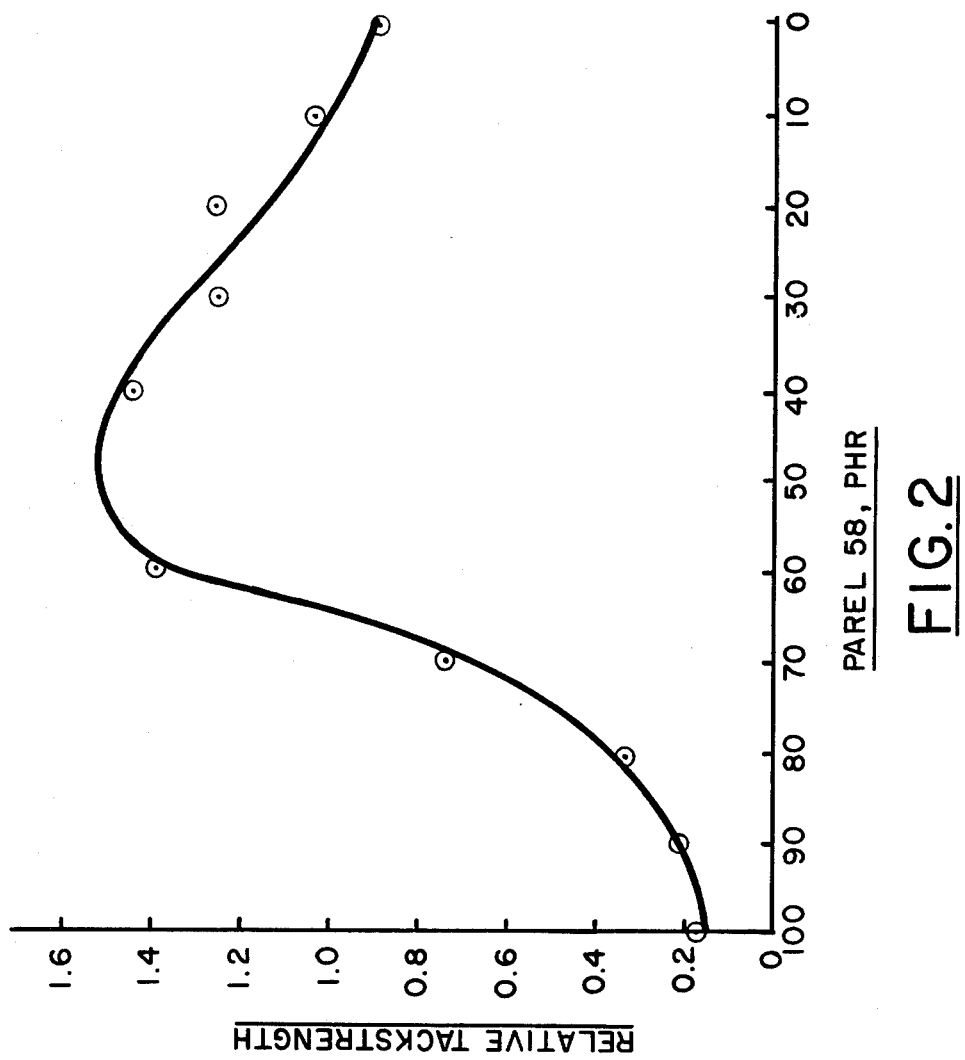

In FIG. 2, data are shown depicting the dependence of tack strength on the blend composition. Tack strength as exhibited in FIG. 2 was obtained on a Ketjen Tack tester. The tack strength of the blends exhibits an unpredictable non-linear behavior. The blend compositions containing 40 to 90 phr of the hexene copolymer had a higher tack strength than either the hexene copolymer or Parel 58 when tested alone. The highest values were obtained for the blends which contain from 40 to 60 phr of the hexene copolymer. The blend compositions containing from 10 to 90 phr of the hexene copolymer exhibit a higher tack strength than Parel 58.

Figure 3:
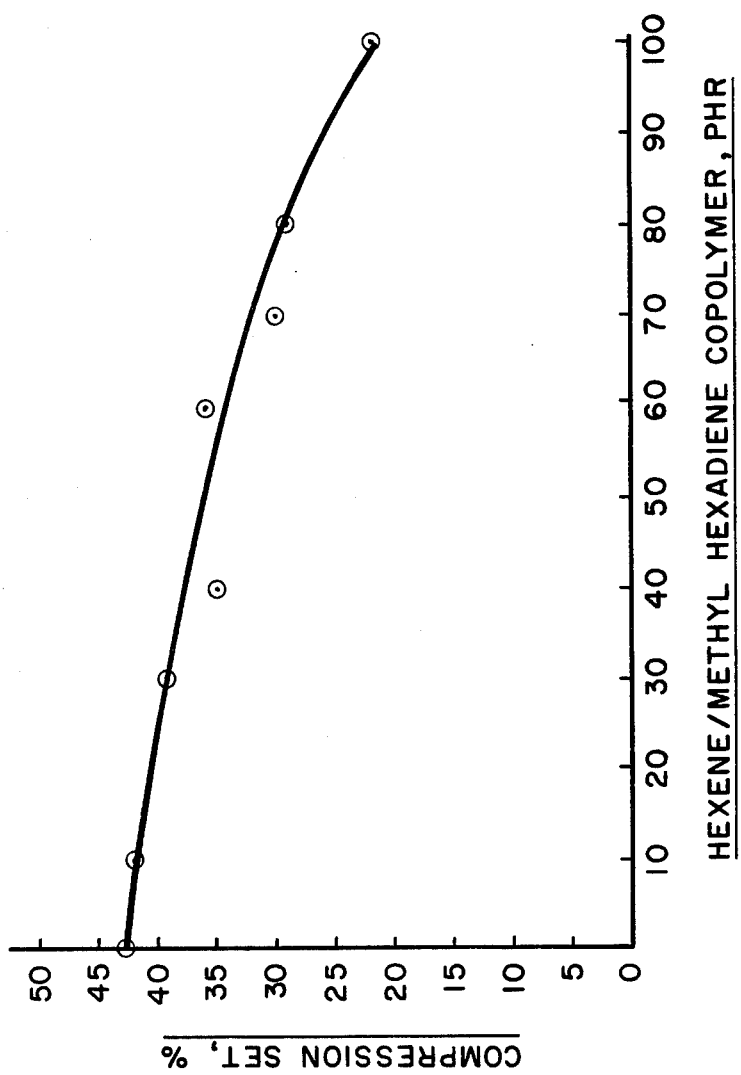

In FIG. 3, the data are given for the compression set of the blends of the invention. This test was run according to ASTM D-395. The data of the compression set are as expected, i.e., show a linear behavior based on composition.

In FIG. 4, the test data show the effect of aging on the tensile strength of the blend of Parel 58 and the hexene copolymer. The curve for the unaged samples shows a gradual linear decrease in tensile strength as the amount of the hexene copolymer is increased. However, the curves for the samples aged for 7 hours at 100° C. and the curves for the samples aged at 149° C. indicate that all blend compositions, particularly those aged at 100° C. do not necessarily decrease when the amount of Parel 58 is gradually decreased. It was also noted that all blends had higher retention of tensile strength on aging than Parel 58.

While certain representative embodiments and details have been shown for the purpose of illustrating the invention, it will be apparent to those skilled in the art that various changes and modifications may be made therein without departing from the spirit or scope of the invention.

What is claimed is:

1. A rubbery composition comprising a blend of between 95/5 and 5/95 weight percent of (1) a rubbery interpolymer consisting of (a) at least 80 weight percent of at least one α-olefin containing from 5 to 10 carbon atoms and (b) at least one nonconjugated polyene containing from 5 to 30 carbon atoms with (2) an unsaturated polymer of an α-olefin oxide prepared from 80 to 99.5 weight percent of at least one monomer having the structure:

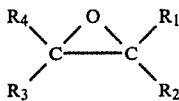
(I)

wherein $R_1$ and $R_2$ are selected from the group consisting of hydrogen or a lower alkyl radical containing from 1 to 8 carbon atoms and $R_3$ and $R_4$ are selected from the group consisting of hydrogen, a lower alkyl radical containing from 1 to 8 carbon atoms and an alkoxyalkyl radical containing up to 12 carbon atoms, an aryl radical, a haloalkyl radical containing from 1 to 12 carbon atoms and in which $R_3$ and $R_4$ taken together may be trimethylene, tetramethylene, or hexamethylene, thereby forming a cyclic epoxide; with from 0.5 to 20 weight percent of a comonomer selected from the group consisting of butadiene monoxide, isoprene monoxide, 1,2-epoxy-3-allyloxypropane (allyl glycidyl ether), 4,5-epoxy-1-hexene, 4,5-epoxy-2-hexene, 1,5-cyclooctadiene monoepoxide, 1-vinyl-3,4-epoxycyclohexane and limonene monoxide.

2. The composition of claim 1 wherein the α-olefin of (1) (a) is 1-hexene.

3. The composition of claim 1 wherein the α-olefin of (1) (a) is 1-hexene and the nonconjugated polyene of (1) (b) is 1,7-octadiene.

4. The composition of claim 1 wherein the nonconjugated polyene is selected from the group of 1,4-hexadiene, 4-methyl-1,4-hexadiene, and 5-methyl-1,4-hexadiene.

5. The composition of claim 1 wherein the nonconjugated polyene is selected from the group of 1,4-hexadiene, 1,5-hexadiene, and 1,7-octadiene.

6. The composition of claim 1 wherein the unsaturated copolymer of (2) is prepared with allyl glycidyl ether as the comonomer.

7. The composition of claim 1 wherein the unsaturated copolymer of (2) is prepared from propylene oxide and allyl glycidyl ether.

8. The composition of claim 1 wherein the α-olefin of (1) (a) is 1-hexene and the unsaturated copolymer of (2) is prepared from propylene oxide and allyl glycidyl ether.

9. The composition of claim 1 wherein the polymer of (1) is prepared from 1-hexene and a mixture of 4-methyl-1,4-hexadiene and 5-methyl-1,4-hexadiene, and the unsaturated copolymer of (2) is prepared from propylene oxide and allyl glycidyl ether.

10. The composition of claim 1 wherein the blend ratios are between 80:20 and 20:80.

* * * * *